US012605751B2

(12) United States Patent
Tan et al.

(10) Patent No.: US 12,605,751 B2
(45) Date of Patent: Apr. 21, 2026

(54) PARTICLE REMOVAL SYSTEM AND METHOD FOR CONTROLLING PARTICLE REMOVAL SYSTEM

(71) Applicants: KAWASAKI JUKOGYO KABUSHIKI KAISHA, Kobe (JP); Kawasaki Robotics (USA), INC., Wixom, MI (US)

(72) Inventors: Haruhiko Tan, Kobe (JP); Nobuyasu Shimomura, San Jose, CA (US); Theodore Philliber, San Jose, CA (US); Ryan Le, Sacramento, CA (US); Avish Ashok Bharwani, Santa Clara, CA (US); Simon Jeyapalan, Newark, CA (US)

(73) Assignees: KAWASAKI JUKOGYO KABUSHIKI KAISHA, Kobe (JP); Kawasaki Robotics (USA), INC., Wixom, MI (US)

( * ) Notice: Subject to any disclaimer, the term of this patent is extended or adjusted under 35 U.S.C. 154(b) by 85 days.

(21) Appl. No.: 18/395,838

(22) Filed: Dec. 26, 2023

(65) Prior Publication Data

US 2025/0205756 A1 Jun. 26, 2025

(51) Int. Cl.
| | |
|---|---|
| *B08B 6/00* | (2006.01) |
| *B08B 1/14* | (2024.01) |
| *B08B 1/50* | (2024.01) |
| *B25J 15/00* | (2006.01) |

(52) U.S. Cl.
CPC ................. *B08B 6/00* (2013.01); *B08B 1/14* (2024.01); *B08B 1/50* (2024.01); *B25J 15/0014* (2013.01)

(58) Field of Classification Search
None
See application file for complete search history.

(56) References Cited

U.S. PATENT DOCUMENTS

| | | | |
|---|---|---|---|
| 2020/0083086 A1* | 3/2020 | Yoshida | ............ H01L 21/68707 |
| 2020/0384509 A1* | 12/2020 | Azaria | ..................... B08B 6/00 |
| 2021/0402445 A1 | 12/2021 | Smith | |
| 2023/0245871 A1* | 8/2023 | Nagaike | ............ H01L 21/67201 |
| | | | 134/1 |

FOREIGN PATENT DOCUMENTS

| | | | |
|---|---|---|---|
| JP | H11-224895 A | 8/1999 | |
| JP | 2016-039250 A | 3/2016 | |
| KR | 100545222 B1 * | 1/2006 | ....... H01L 21/67742 |
| WO | WO-2019240029 A1 * | 12/2019 | ............. C23C 14/34 |

OTHER PUBLICATIONS

Machine translation: KR100545222; Young, H. (Year: 2006).*
Machine translation: WO2019240029; Hirotoshi, S. (Year: 2019).*

* cited by examiner

*Primary Examiner* — Natasha N Campbell
(74) *Attorney, Agent, or Firm* — METROLEX IP LAW GROUP, PLLC; Robert L. Scott, Esq.

(57) ABSTRACT

A particle removal system according to this disclosure includes a particle absorption tool configured to be electrostatically charged so as to build up a static electric charge for absorbing particles. The particle removal system includes a charger a robot, and a controller. The controller is configured to control operation of the robot to electrostatically charge the particle absorption tool so as to build up the static electric charge by using the charger.

11 Claims, 8 Drawing Sheets

100

PARTICLE REMOVAL SYSTEM

ROBOT        151    150

HAND      152

ROBOT ARM    152a

DRIVER

20

CHARGER    21

VOLTAGE APPLIER

153

MOVER

CONTROLLER    160

MAIN CONTROLLER    161

SERVO CONTROLLER    162

DRIVE CIRCUIT    163

STORAGE    164

ALIGNER    140

10

PARTICLE ABSORPTION TOOL

CONTAINER    30

CLEANER    60

DETECTOR    50

CHARGE-AMOUNT DETECTOR    51

IMAGE CAPTURER    52

10

IV        IV

10a

PARTICLE REMOVAL SYSTEM AND METHOD FOR CONTROLLING PARTICLE REMOVAL SYSTEM

BACKGROUND OF THE INVENTION

Field of the Invention

The present disclosure relates to a particle removal system and a method for controlling a particle removal system.

Description of the Background Art

Tools for absorbing particles such as dust in semiconductor production apparatuses are known in the art. Japanese Patent Laid-Open Publication No. JP H11-224895 discloses a disk-shaped particle-removing tool configured to be electrostatically charged. In Japanese Patent Laid-Open Publication No. JP H11-224895, the disk-shaped particle-removing tool is held by a hand of a robot arm placed in a substrate conveyor similar to wafers. When the particle-removing tool comes in contact with the hand, and particles that cling to the hand are absorbed to the particle-removing tool brought in a charged state. As a result, the particles clinging to the hand can be removed from the hand.

Here, as disclosed in Japanese Patent Laid-Open Publication No. JP H11-224895, in a case in which particles cling to the hand are removed by using the particle-removing tool electrostatically brought in the charged state, the particle-removing tool is necessarily previously charged. Also, as stated in Japanese Patent Laid-Open Publication No. JP H11-224895, in a case in which particles are removed from an interior of an apparatus such as the substrate conveyor by using the particle-removing tool, the apparatus, which is an area to be subjected to particle removal, is necessarily temporarily opened to manually charge the particle-removing tool. However, if the apparatus is even temporarily opened, particles such as dust will come into the area to be subjected to particle removal. For this reason, it is desired to charge such a particle-removing tool without opening an area to be subjected to particle removal.

SUMMARY OF THE INVENTION

The disclosure invention is intended to solve the above problem, and one object of the present disclosure is to provide a particle removal system and a method for controlling a particle removal system capable of charging a particle-removing tool without opening an area to be subjected to particle removal.

A particle removal system according to a first aspect of the present disclosure includes a particle absorption tool configured to be electrostatically charged so as to build up a static electric charge for absorbing particles; a charger configured to electrostatically charge the particle absorption tool so as to build up the static electric charge; a robot including a hand configured to hold the particle absorption tool; and a controller configured to control operation of the robot to electrostatically charge the particle absorption tool so as to build up the static electric charge by using the charger.

As discussed above, the particle removal system according to the first aspect of this disclosure includes the controller configured to control operation of the robot to electrostatically charge the particle absorption tool so as to build up the static electric charge by using the charger. According to this configuration, because the controller is configured to control operation of the robot to electrostatically charge the particle absorption tool so as to build up the static electric charge by using the charger, Accordingly, the particle absorption tool can be charged in an area to be subjected to particle removal by the charger in the interior space of the container. As a result, it is possible to charge the particle absorption tool without opening the area to be subjected to particle removal. Also, because the controller is configured to control operation of the robot to electrostatically charge the particle absorption tool so as to build up the static electric charge by using the charger, the particle absorption tool can be automatically charged without manual intervention.

A method for controlling a particle removal system according to a second aspect of the present disclosure includes holding a particle absorption tool configured to be electrostatically charged so as to build up a static electric charge for absorbing particles by using a hand included in a robot; electrostatically charging the particle absorption tool so as to build up the static electric charge by using the charger by operating the robot; and absorbing the particles by using the particle absorption tool building up the static electric charge.

As discussed above, the method for controlling a particle removal system according to a second aspect of the present disclosure includes electrostatically charging the particle absorption tool so as to build up the static electric charge by using the charger by operating the robot. Accordingly, because the particle absorption tool is electrostatically charged so as to build up the static electric charge by using the charger by operating the robot, the particle absorption tool can be charged in an area to be subjected to particle removal by the charger in the interior space of the container. Consequently, it is possible to provide a method for controlling a particle removal system capable of charging the particle absorption tool without opening the area to be subjected to particle removal. Also, because the particle absorption tool is electrostatically charged so as to build up the static electric charge by using the charger by operating the robot, it is possible to provide a method for controlling a particle removal system capable of automatically charging the particle absorption tool without manual intervention.

According to a particle removal system and a method for controlling a particle removal system of the present disclosure, it is possible to charge a particle absorption tool without opening equipment.

DESCRIPTION OF THE PREFERRED EMBODIMENT

First Embodiment

The following description will describe a first embodiment embodying the present disclosure with reference to the drawings.

The following description describes a particle removal system 100 according to a first embodiment with reference to FIGS. 1 to 11. In this specification, the upward/downward direction is defined as a Z direction. An upper side is defined a Z1 side, and a lower side is defined as a Z2 side. A direction orthogonal to the Z direction is defined as an X direction. One side in the X direction is defined as an X1 side, and another side is defined as an X2 side. A direction orthogonal to the Z direction and the X direction is defined as a Y direction. One side in the Y direction is defined as an Y1 side, and another side is defined as an Y2 side.

(Semiconductor Production Apparatus)

Figure 1:
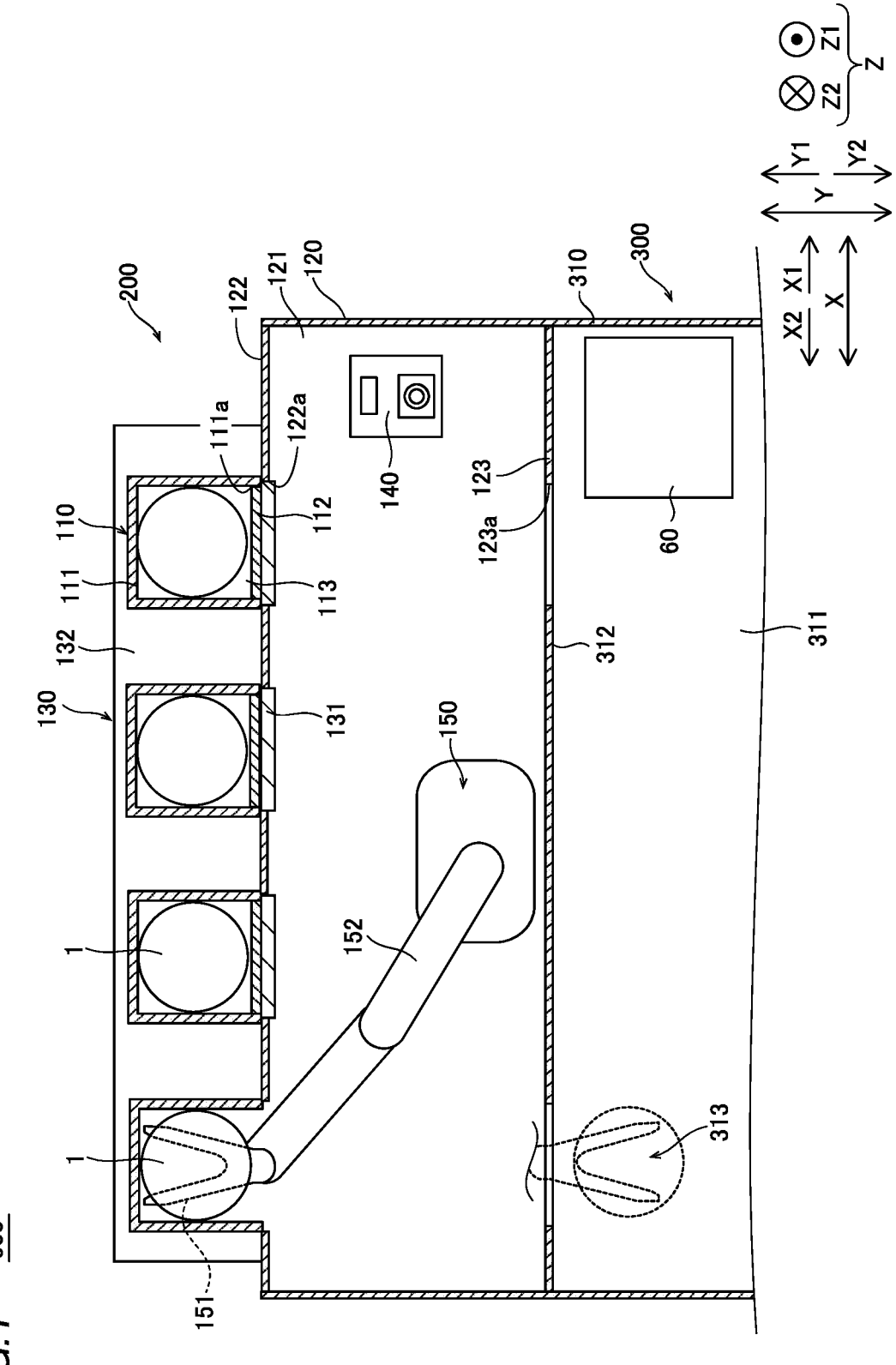
FIG. 1 is a view showing a semiconductor production apparatus according to a first embodiment.

The following description describes a semiconductor production apparatus 500. As shown in FIG. 1, the semiconductor production apparatus 500 is an apparatus for processing substrates 1 formed of a semiconductor such as wafers. The semiconductor production apparatus 500 includes a substrate conveyor 200 and a substrate processor 300. The semiconductor production apparatus 500 is placed a clean room, for example.

(Substrate Conveyor)

The following description describes the substrate conveyor 200. For example, the substrate conveyor 200 is an EFEM (Equipment Front End Module). The substrate conveyor 200 includes FOUPs 110, a housing 120, an FOUP opener 130, an aligner 140, a robot 150, and a controller 160 shown in FIG. 2. The aligner 140 is an example of a position adjuster.

(FOUP)

Each FOUP 110 contains a plurality of substrates 1 before and after processing. An interior of the FOUP 110 is maintained clean similar to the clean room. The FOUP 110 includes a housing 111 and an opening/closing part 112. The housing 111 has a box shape, and includes an opening 111a opened toward an interior of the substrate conveyor 200. The opening/closing part 112 configured to cover the opening 111a of the housing 111. The number of FOUPs 110 is four, for example.

(Housing)

The housing 120 has interior space 121. The interior space 121 is filled with a highly clean atmospheric gas. A robot 150 is placed in the interior space 121 of the housing 120. The housing 120 has a rectangular shape, for example. The housing 120 includes a wall 122 on the Y1 side having an opening 122a through which interior space of the housing is connected to the interior space 113 of the FOUP 110. Each substrate 1 can be moved between the FOUP 110 and the substrate conveyor 200 through the opening 122a. The housing 120 includes a wall 123 on the Y2 side having an opening 123a through which interior space of the housing is connected to interior space 311 of the substrate processor 300. Each substrate 1 can be moved between the substrate processor 300 and the substrate conveyor 200 through the opening 123a.

The following description describes the FOUP opener 130. The FOUP opener 130 is placed on the Y1 side of the substrate conveyor 200. The FOUP opener 130 includes opening/closing parts 131 and an FOUP support 132. Each opening/closing part 131 is arranged on the opening 122a of the wall 122 on the Y1 side of the housing 120. An opening mechanism configured to operate opening/closing part 131 and the opening/closing part 112 opens the opening/closing part 131 of the FOUP opener 130 and the opening/closing part 112 of the FOUP 110 so that the interior space 113 of the FOUP 110 is connected to the interior space 121 of the housing 120.

The following description describes the aligner 140. The aligner 140 is configured to receive the substrate 1 on the aligner. The aligner 140 adjusts a position of the substrate 1. The aligner 140 executes at least one of rotating the substrate 1 to align the substrate 1 so as to agree a notch or an orientation flat formed in the substrate 1 with a predetermined orientation, and detecting an edge of the substrate 1 and eccentricity of the substrate 1 while rotating the substrate 1. The aligner 140 is placed in the interior space 121 of the housing 120 of the substrate conveyor 200.

The following description describes the robot 150. The robot 150 is placed in the interior space 121 of the housing 120 of the substrate conveyor 200. The robot 150 is a horizontal multi-joint robot, for example. The robot 150 includes a hand 151 and a robot arm 152. The hand 151 is configured to hold the substrate 1. For example, the hand 151 has a Y shape forming a bifurcated distal end. The hand 151 is arranged on a distal end of the robot arm 152. The robot arm 152 includes a plurality of links.

Figures 2, 3:
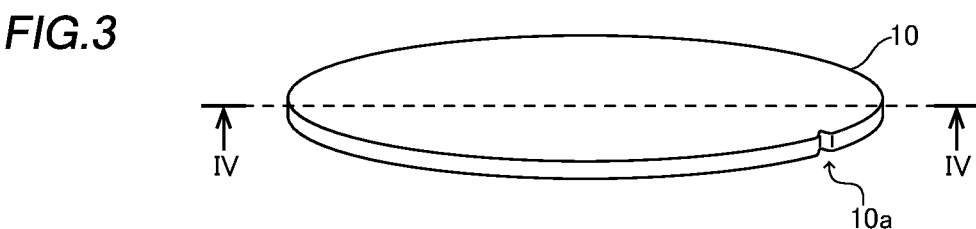
FIG. 2 is a block diagram showing a particle removal system according to the first embodiment.
FIG. 3 is a view showing a particle absorption tool according to the first embodiment.

The following description describes a configuration of the controller 160. The controller 160 is a robot controller. As shown in FIG. 2, the controller 160 includes a main controller 161, a servo controller 162, drive circuits 163, and a storage 164. The main controller 161 and the servo controller 162, for example, include a CPU (Central Processing Unit). The main controller 161 controls drivers 152a of the robot arm 152. The servo controller 162 controls electric power supplied to the drivers 152a of the robot arm 152 based on commands from the main controller 161. The drive circuits 163 supply driving power to the drivers 152a of the robot arm 152. Specifically, the robot arm 152 includes two or more drivers 152a, and each of the drive circuits 163 is provided for corresponding one of the drivers 152a of the robot arm 152. Alternatively, one common drive circuit 163 can be provided for the drivers 152a. Each driver 152a includes a servo motor, an encoder and a reduction gear. The storage 164 stores programs to be executed by the controller 160.

(Substrate Processor)

The following description describes the substrate processor 300. As shown in FIG. 1, the substrate processor 300 configured to apply processing to the substrate 1. For example, the substrate processor 300 can apply the processes such as thermal process, impurity introduction process, thin-film formation process, lithography process, cleaning process, and planarization process to the substrate 1. The substrate processor 300 is arranged adjacent to the substrate conveyor 200. The substrate processor 300 includes a housing 310 with interior space 311. A wall 312 on the Y1 side of the housing 310 of the substrate processor 300 is the same as the wall 123 on the Y2 side of the housing 120 of the substrate conveyor 200. A receiving part 313 on which the substrate 1 is placed is arranged in the interior space 311 of the substrate processor 300.

(Particle Removal System)

The particle removal system 100 is a system for charging a particle absorption tool 10. As shown in FIG. 2, the particle removal system 100 includes the aligner 140, the robot 150, the particle absorption tool 10, a charger 20, a container 30, a detector 50, a cleaner 60, and the controller 160.

(Particle Absorption Tool)

The following description describes the particle absorption tool 10. The particle absorption tool 10 can be held on the hand 151. Also, the particle absorption tool 10 is configured to be electrostatically charged so as to build up a static electric charge for absorbing particles. Also, as shown in FIG. 3, the particle absorption tool 10 has, for example, a disk shape, and has the same diameter as the substrate 1. In other words, the particle absorption tool 10 has a disk shape similar to the substrate 1. In the first embodiment, the hand 151 of the robot 150 is configured to hold the substrate 1 and the particle absorption tool 10 in the substrate conveyor 200.

Figure 4:
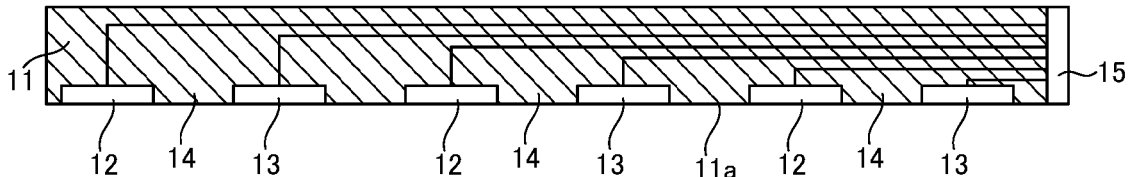
FIG. 4 is a cross-sectional view of the particle absorption tool taken along a line IV-IV in FIG. 3.

Also, as shown in FIG. 4, the particle absorption tool 10 includes a semiconductor substrate 11, and anodes 12, cathodes 13, bias electrodes 14, and an interface 15, for example. The anodes 12 and the cathodes 13 are formed by impurity introduction. The anodes 12, the bias electrodes 14, and the cathodes 13 are arranged in this order on one surface 11$a$ as a main surface of the semiconductor substrate 11. The interface 15 is located on a peripheral part of the semiconductor substrate 11 in the disk-shape particle absorption tool 10. The interface 15 is connected to the anodes 12 and the cathodes 13. A voltage is applied to the interface 15 from a voltage applier 21 of the charger 20 shown in FIG. 5.

Accordingly, the voltage is applied to the anodes 12 and the cathodes 13 so that the one surface 11$a$ of the semiconductor substrate 11 is charged. The interfaces 15 are examples of a contact part.

(Charger)

The following description describes the charger 20. The charger 20 is a device configured to electrostatically charge the particle absorption tool 10 so as to build up the static electric charge. As shown in FIG. 2, the charger 20 includes a voltage applier 21.

Figure 5:
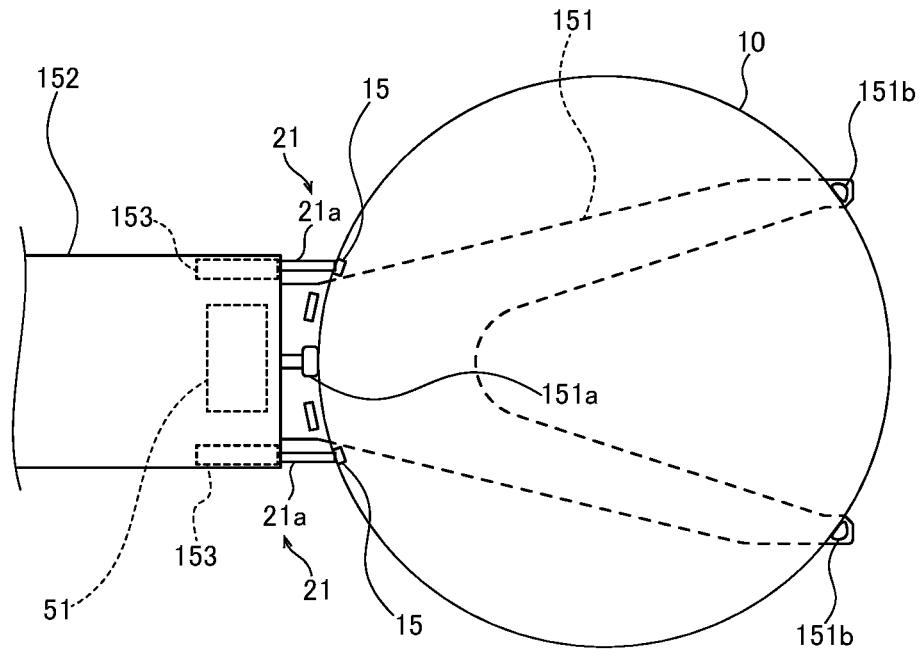
FIG. 5 is a schematic view illustrating application of a voltage to the particle absorption tool in the first embodiment.

As shown in FIG. 5, the voltage applier 21 is configured to contact the interface 15 of the particle absorption tool 10 and to apply a voltage to the particle absorption tool 10. For example, the voltage applier 21 contains a plurality of probes 21$a$. When the plurality of probes 21$a$ come into contact with the interface 15 of the particle absorption tool 10, the voltage can be applied to the anodes 12 and the cathodes 13. The voltage applier 21 is included in the robot 150. Specifically, the voltage applier 21 is arranged in a distal end part of the robot arm 152. The robot 150 includes movers 153 configured to move probes 21$a$ of the voltage applier 21.

A base end part of the hand 151 is connected to the distal end part of the robot arm 152. The hand 151 includes a holding part 151$a$ and hook parts 151$b$. The holding part 151$a$ is configured to move from the base end part to a distal end part of the hand 151, and to contact the substrate 1 and the particle absorption tool 10 being held by the hand 151. For example, the holding part 151$a$ is moved by a driving force applied by an air actuator as a driving source. The hook parts 151$b$ are arranged in bifurcated distal ends of the hand 151, which has a Y shape. The holding part 151$a$ is moved so that the substrate 1 or the particle absorption tool 10 held by the hand 151 is caught between the holding part 151$a$ and the hook parts 151$b$. That is, the hand 151 is an active type substrate holding hand configured to securely hold the substrate 1 and the particle absorption tool 10.

A voltage applier 21 set is arranged in the distal end part of the robot arm 152, and configured to extend from the base end part to the distal end part of the hand 151. The probe 21$a$ of the voltage applier 21 is arranged in the distal end part of the robot arm 152, and is moved by operation of the mover 153 from an arrangement in which the probe is not in contact with the particle absorption tool 10 being held by the hand 151 to an arrangement in which the probe is in contact with the particle absorption tool 10 being held by the hand 151. That is, the voltage applier 21 is brought into contact with the interface 15 of the particle absorption tool 10 by moving in a direction from the base end part to the distal end part of the hand 151 by the operation of the mover 153. In addition, when the robot 150 holds the substrate 1 by using the hand 151, the mover 153 retracts the voltage applier 21 to the robot arm 152 side so that the probe 21$a$ of the voltage applier 21 is out of contact with the substrate 1. The mover 153 includes an air actuator, an electric motor, a solenoid, etc. as a driving source, for example. The particle absorption tool 10 includes a pair of interfaces 15. The robot 150 includes a pair of probes 21$a$ corresponding to the pair of interfaces 15. The controller 160 is included in a base of the robot 150, for example. The controller 160 and the voltage applier 21 of the charger 20 are connected to each other through wires arranged inside the robot arm 152. The controller 160 is configured to supply electric power to the voltage applier 21 so as to apply a voltage to the particle absorption tool 10.

As shown in FIG. 3, notch 10$a$ which is an indentation, is formed in a peripheral part of the disk-shaped particle absorption tool 10. The aligner 140 is configured to adjust a position of the particle absorption tool 10 by detecting a position of the notch 10$a$ similar to the substrate 1. In other words, the aligner 140 orientates the particle absorption tool 10 placed similar to the substrate 1 in a predetermined orientation. The robot 150 holds the particle absorption tool 10 whose position is adjusted by using the hand 151, moves the probes 21$a$ toward the held particle absorption tool 10 direct the hand to hold the particle absorption tool whose position is being adjusted by using the mover 153 so as to bring the probes into contact with the interfaces 15. That is, the aligner 140 adjusts a rotational position of the particle absorption tool 10 so that the interfaces 15 are positioned at positions that allow the interfaces to contact the voltage appliers 21 arranged provided to the robot arm 152.

(Container)

Figure 6:
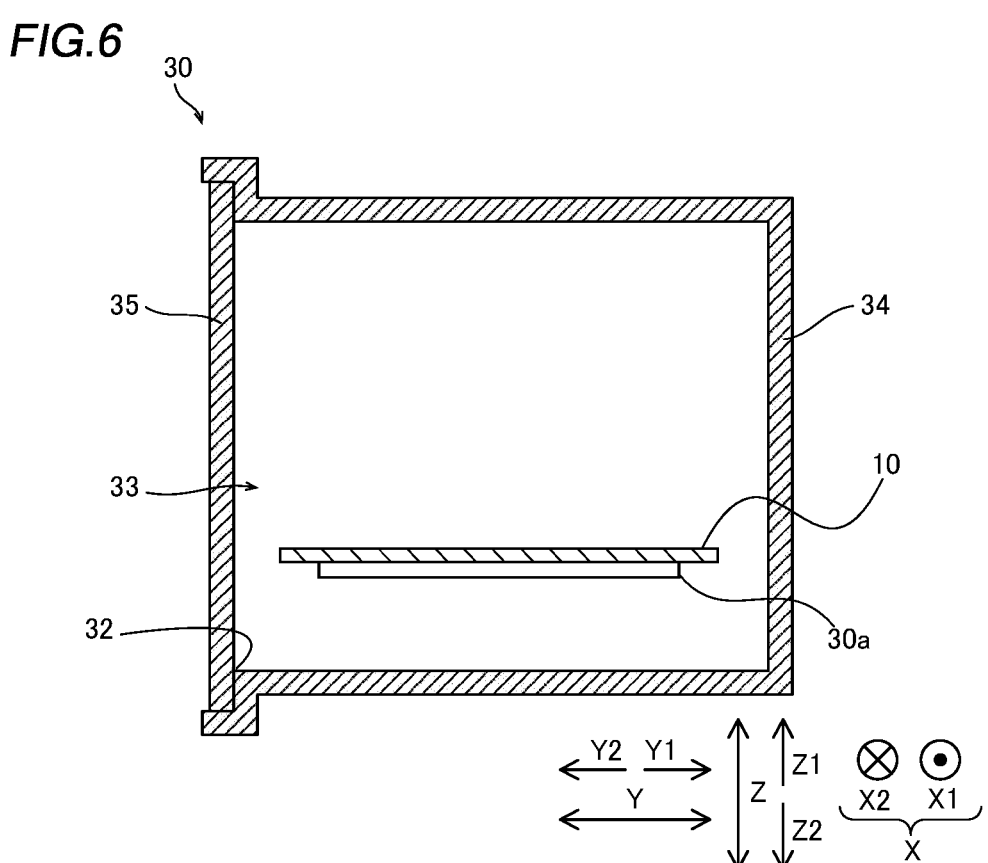
FIG. 6 shows a cross-sectional view showing a container according to the first embodiment as viewed from a side.

The following description describes the container 30. In the first embodiment, as shown in FIG. 6, the container 30 previously accommodates the particle absorption tool 10.

Figure 7:
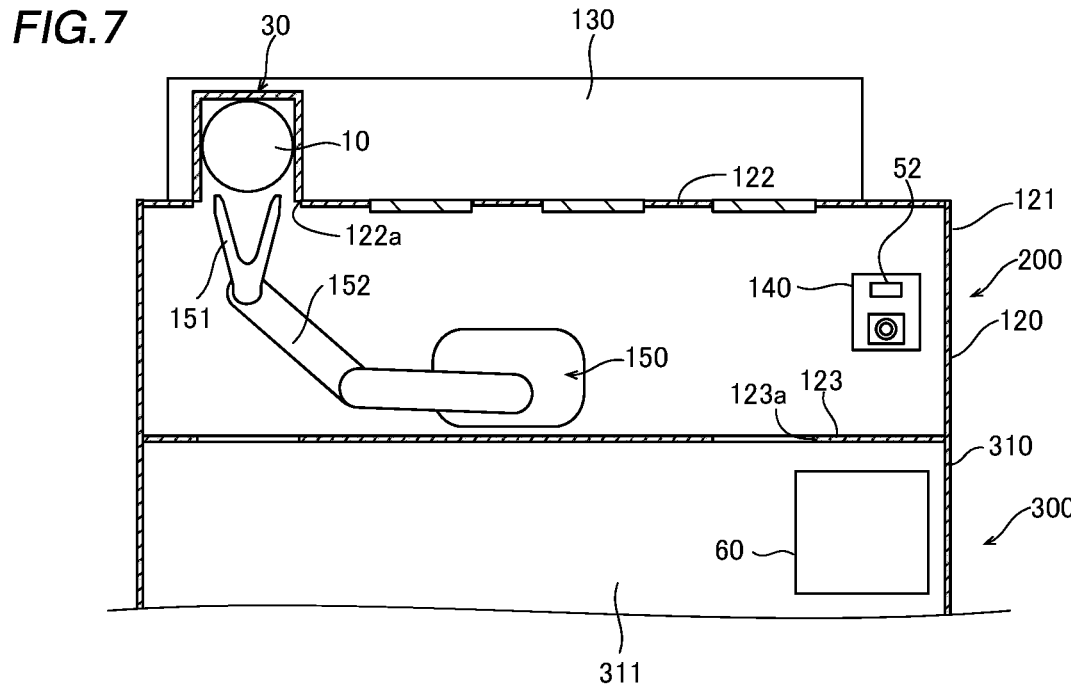
FIG. 7 is a schematic view illustrating an arrangement of the particle absorption tool with respect to the substrate conveyor.

The container 30 is attached to the substrate conveyor 200, and arranged in a place where the FOUP 110 for accommodating substrates 1 in the substrate conveyor 200 is arranged as shown in FIG. 7. As shown in FIG. 6, the particle absorption tool 10 is placed in the interior space 33 of the container 30. An interior of the container 30 is maintained clean in addition to the FOUP 110 similar to the clean room. The container 30 includes a housing 34 and an opening/closing part 35. The housing 34 has a box shape, and includes the opening 32 opened to the interior of the substrate conveyor 200. The opening/closing part 35 is configured to cover the opening 32 of the housing 34. As shown in FIG. 7, the container 30 is arranged in the FOUP opener 130 where the FOUP 110 is placed in the substrate conveyor 200. The opening/closing part 131 of the FOUP opener 130 and the opening/closing part 35 of the container 30 are opened to connect the interior space 33 of the tool container 30 to the interior space 121 of the housing 120. Accordingly, the particle absorption tool 10 can be moved between the container 30 and the substrate conveyor 200 through the opening 122a of the housing 120. Also, the particle absorption tool 10 can be moved between the substrate conveyor 200 and the substrate processor 300 through the opening 123a of the housing 120.

In the first embodiment, as shown in FIG. 7, an exterior shape of the container 30 is common to an exterior shape of the FOUP 110. Specifically, the housing 34 of the container 30 shown in FIG. 6 and the housing 111 of the FOUP 110 shown in FIG. 1 have the same size. For this reason, the container 30 can be placed in the FOUP opener 130 instead of the FOUP 110. In addition, a diameter of the particle absorption tool 10 is the same as a diameter of the substrate 1. Accordingly, the particle absorption tool 10 can be accommodated in the container 30 similar to a case in which substrate 1 is accommodated in the FOUP 110. For example, the particle absorption tool 10 is supported by a support 30a of the container 30. An interior of the container 30 is maintained clean with the particle absorption tool 10 being accommodated in the container 30.

(Detector)

In the first embodiment, a detector 50 is provided to detect a degree of particle absorption by the particle absorption tool 10 during a series of operations of the robot arm 152. The series of operations of the robot arm 152 will be described later. The detector 50 includes a charge-amount detector 51 configured to detect a charge amount of the particle absorption tool 10, and an image capturer 52 configured to capture an image of the particles that are absorbed by the particle absorption tool 10 as shown in FIG. 2. The charge-amount detector 51 is a surface potentiometer, for example. The surface potentiometer can measure an amount of static electric charge by using electrostatic induction phenomenon in which an electric conductor is attracted by a charged object. The surface potentiometer can measure the amount of static electric charge without contact with the particle absorption tool 10. As shown in FIG. 5, the charge-amount detector 51 of the detector 50 is arranged in the distal end part of the robot arm 152. The charge-amount detector 51 is configured to detect a degree of particle absorption by the particle absorption tool 10 being held by the hand 151. As shown in FIG. 7, an image capturer 52 of the detector 50 is provided to the aligner 140. The image capturer 52 is configured to detect the degree of particle absorption by the particle absorption tool 10 by capturing an image of the particle absorption tool 10 being placed on the aligner 140. In the first embodiment, the particle absorption tool 10 absorbs particles with a charged surface 11a of the particle absorption tool facing the lower Z2 side, which is a lower side. The image capturer 52 provided to the aligner 140 captures an image of the particle absorption tool 10 with the surface 11a facing the Z2 side. In other words, the image capturer 52 is orientated in the aligner 140 to face from the Z2 side to the Z1 side so as to capture the image. For example, the image capturer 52 is a high-resolution camera capable of capturing an image of particles.

In the first embodiment, the cleaner 60 configured to clean the particle absorption tool 10. As shown in FIG. 1, the cleaner 60 is arranged, for example, in the interior space 311 of the substrate processor 300. The substrate processor 300 is a spin dryer, for example. The spin dryer rotates the particle absorption tool 10 to remove particles absorbed onto the particle absorption tool 10 by centrifugal force.

(Method For Controlling Particle Removal System)

The following description describes a method for controlling the particle removal system 100 in operation of removal of particles inside the semiconductor production apparatus 500 executed by the substrate conveyor 200. The operation of the substrate conveyor 200 is controlled by the controller 160. The particle absorption tool 10 is previously manually placed in the container 30. The container 30 is arranged in the substrate conveyor 200 while the interior of the container 30 is maintained clean with the particle absorption tool 10 being accommodated in the container 30. The substrate 1 is not processed by the semiconductor production apparatus 500 during the operation of removal of particles. As shown in FIG. 7, the container 30 is arranged instead of the FOUP 110 in the FOUP opener 130. One container 30 or a plurality of containers 30 can be provided in the FOUP opener 130. The following description describes an exemplary arrangement in which one container 30 is provided in the FOUP opener 130.

Figure 8:
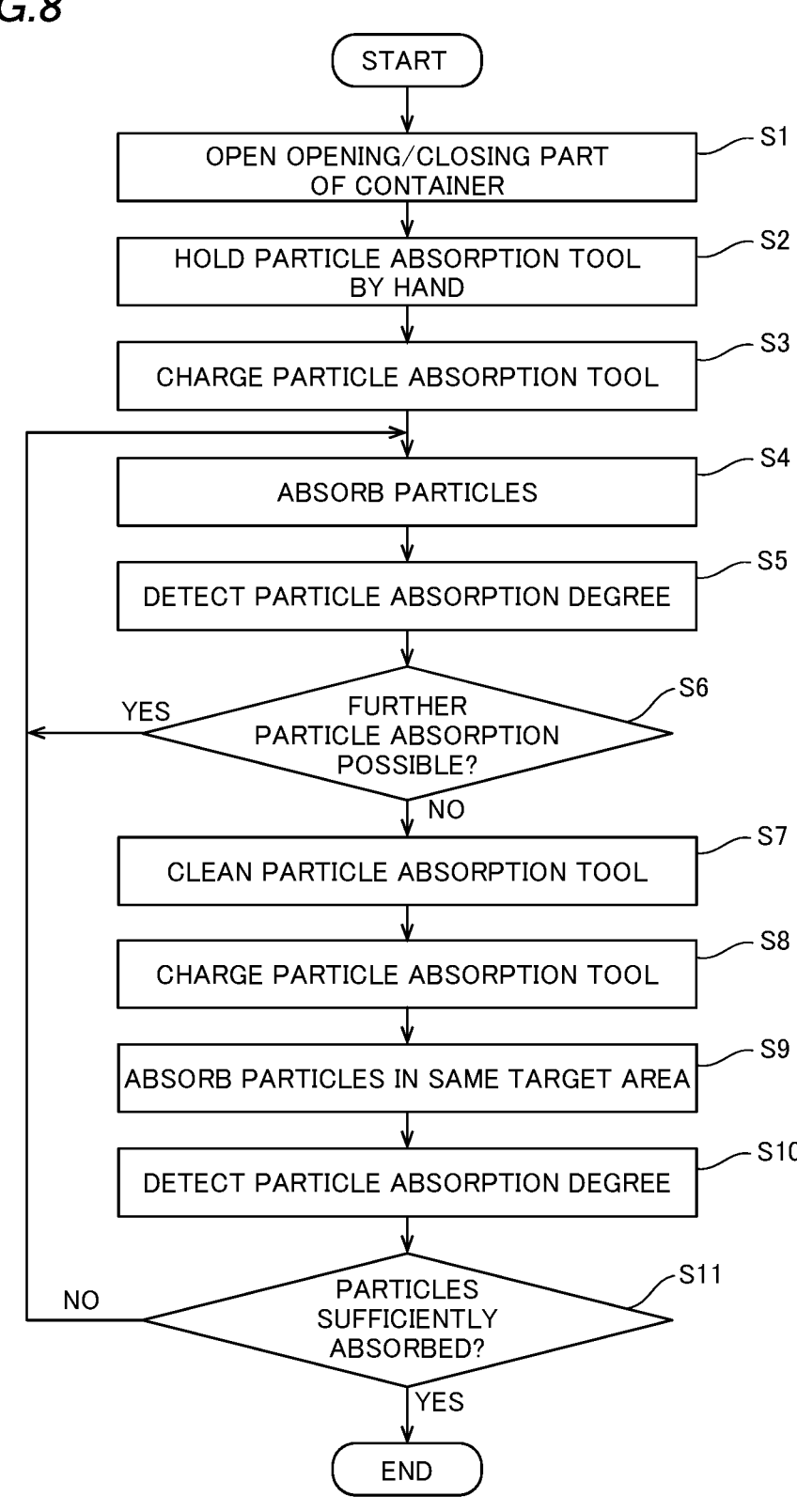
FIG. 8 is a flowchart illustrating a method for controlling the particle removal system according to the first embodiment.

As shown in FIG. 8, in step S1, the opening/closing part 131 of the FOUP opener 130 and the opening/closing part 35 of the container 30 are opened to connect the interior space 33 of the container 30 to the interior space 121 of the housing 120 of the substrate conveyor 200 by the controller 160 by moving the opening mechanism.

Figure 9:
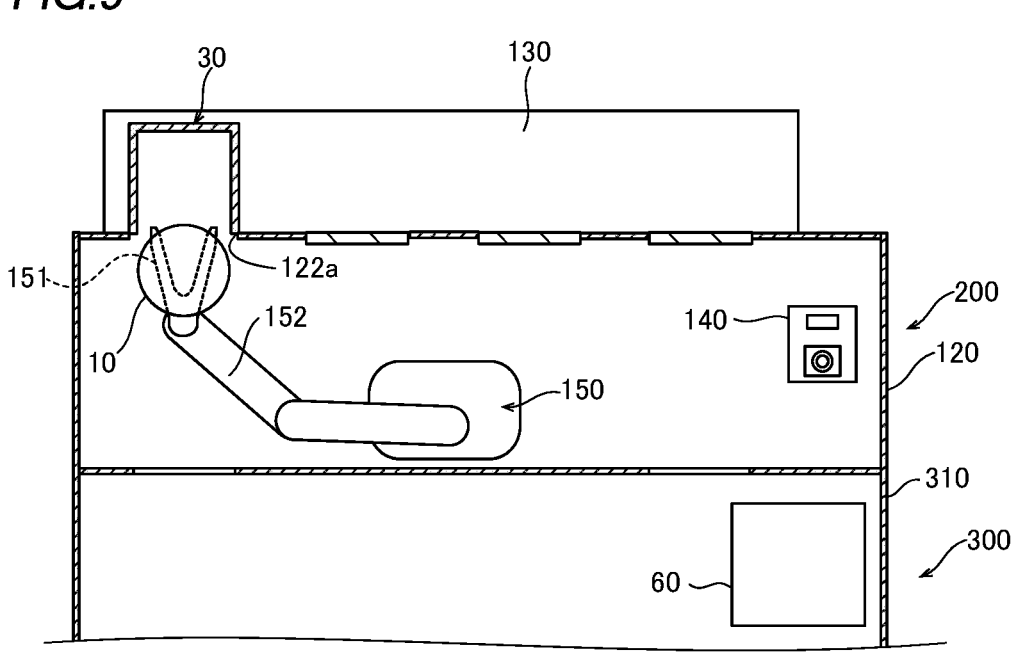
FIG. 9 is a view showing the semiconductor production apparatus with a hand going to hold the particle absorption tool.

In step S2, as shown in FIG. 9, in the first embodiment, the controller 160 directs the hand 151 of the robot arm 152 to hold the particle absorption tool 10 previously accommodated in the container 30. Specifically, the controller 160 moves the hand 151 through the opening 122a of the housing 120 of the substrate conveyor 200 into the interior space 33 of the container 30.

In step S3, as shown in FIG. 5, in the first embodiment, the controller 160 controls operation of the robot 150 to electrostatically charge the particle absorption tool 10 so as to build up the static electric charge by using the charger 20. The controller 160 directs the hand 151 to hold the particle absorption tool 10, which is previously accommodated in the container 30, and then controls operation of the robot 150 to bring the particle absorption tool 10 being held by the hand 151 the substrate conveyor 200 into contact with the voltage applier 21 of the charger 20, which is arranged in the distal end of the robot arm 152, to electrostatically charge a particle absorption tool 10 so as to build up a static electric charge. Specifically, after holding the particle absorption tool 10 accommodated in the container 30, the controller 160 conveys the particle absorption tool 10 to the aligner 140. Subsequently, the controller 160 adjusts a position of the particle absorption tool 10 by using the aligner 140. The controller 160 then holds the particle absorption tool 10 aligned with the aligner 140 by the hand 151. Subsequently, the controller 160 moves the voltage applier 21 by using the mover 153 so as to bring the voltage applier 21 into contact with the interface 15 in the disk-shape particle absorption tool 10 held by the hand 151 with a position of the particle absorption tool being adjusted. The controller 160 brings the voltage applier 21 into contact with the interface 15 by controlling operation of the robot 150, and apply a voltage to the particle absorption tool 10.

Figure 10:
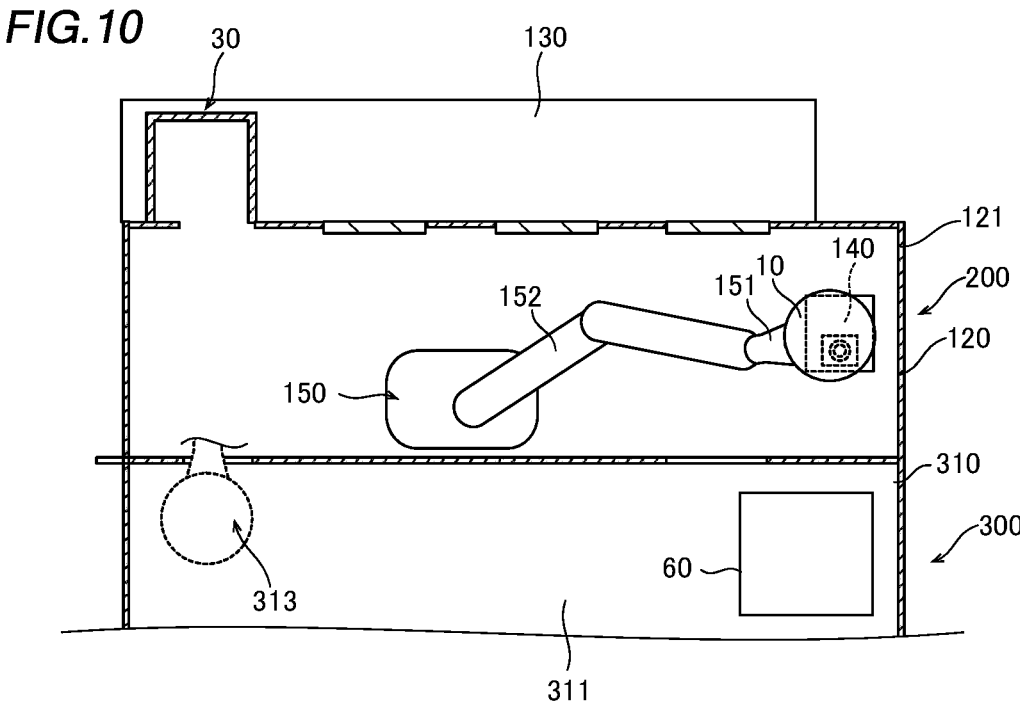
FIG. 10 is a view showing the semiconductor production apparatus in removal of particles on an aligner by using the particle absorption tool.

In step S4, in the first embodiment, after charging the particle absorption tool 10, the controller 160 moves the robot arm 152 and then absorbs particles in at least one of the interior of the substrate conveyor 200 and the interior of the substrate processor 300 by using the particle absorption tool 10 held by the hand 151. Specifically, the particle absorption tool 10 that has been accommodated in the container 30 is moved to the substrate conveyor 200 through the opening 122a of the housing 120 of the substrate conveyor 200, and the substrate processor 300 through the opening 123a. As shown in FIG. 10, the particle absorption tool 10 can absorb particles cling to a part of the aligner 140, which is arranged in the interior space 121 of the substrate conveyor 200, where the substrate 1 is placed, and the receiving part 313 on which the substrate 1 is placed in the interior space 311 of the substrate processor 300.

In step S5, in the first embodiment, the controller 160 detects a degree of particle absorption by the particle absorption tool 10 by using the detector 50. Specifically, the controller 160 moves the particle absorption tool 10 being held by the hand 151 to a position in which an image of the particle absorption tool is captured by the image capturer 52 provided to the aligner 140. Subsequently, the controller 160 detects an amount of particles absorbed onto the particle absorption tool 10 by using the charge-amount detector 51 and the image capturer 52 of the detector 50.

Then, in step S6, the controller 160 determines whether the particle absorption tool 10 can further absorb particles. In a case in which the detector 50 is the image capturer 52, the controller 160 detects the amount of absorbed particles based on an image of the particle absorption tool 10 captured by the image capturer 52 by using image processing or some other technique. If the amount of absorbed particles is not greater than a predetermined particle amount threshold, the controller 160 determines that the particle absorption tool 10 can further absorb particles, and the procedure returns to step S4. If the amount of absorbed particles is greater than the predetermined particle amount threshold, the controller 160 determines that the particle absorption tool 10 cannot further absorb particles, and the procedure goes to step S7. In a case in which the detector 50 is the charge-amount detector 51, the charge amount of the particle absorption tool 10 is detected by the charge-amount detector 51. If the charge amount of the particle absorption tool 10 detected by the charge-amount detector 51 is greater than a predetermined charge amount threshold, the controller 160 determines that the particle absorption tool 10 can further absorb particles, and the procedure returns to step S4. If the charge amount of the particle absorption tool 10 detected by the charge-amount detector 51 is not greater than the predetermined charge amount threshold, the controller 160 determines that the particle absorption tool 10 cannot further absorb particles, and the procedure goes to step S7. Accordingly, the degree of particle absorption is detected by the detector 50 during the series of operations in which particles are repeatedly absorbed in step S4.

Figure 11:
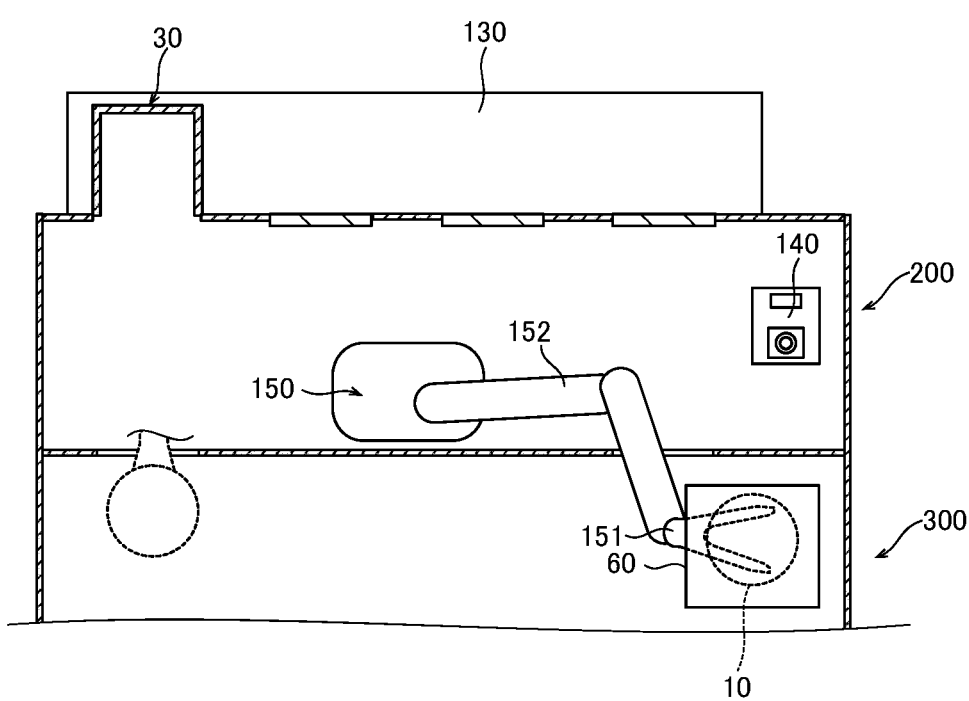
FIG. 11 is a view showing the semiconductor production apparatus in cleaning of the particle absorption tool by using a cleaner.

In step S7, as shown in FIG. 11, in the first embodiment, after absorbing particles by using the particle absorption tool 10, the controller 160 moves the hand 151 by using the robot arm 152 so as to move the particle absorption tool 10 to the cleaner 60. The cleaner 60 cleans the particle absorption tool 10 moved.

Subsequently, in step S8, the controller 160 electrostatically charges the particle absorption tool 10 so as to build up the static electric charge by using the charger 20 similar to step S3. In step S8, the controller 160 brings the voltage applier 21, which is arranged in the distal end of the robot arm 152, of the charger 20 into contact with the particle absorption tool 10 being held by the hand 151 to electrostatically charge the particle absorption tool 10 so as to build up the static electric charge by controlling operation of the robot 150 similar to step S3.

Subsequently, in step S9, the controller 160 absorbs particles in the same target area as step S4 in order to confirm whether the particles is completely absorbed in the target area for absorption of particles in at least one of the interior of the substrate conveyor 200 and the interior of the substrate processor 300. For example, the particle absorption tool 10 can absorb particles cling to a part of the aligner 140, which is arranged in the interior space 121 of the substrate conveyor 200, where the substrate 1 is placed, and the receiving part 313 on which the substrate 1 is placed in the interior space 311 of the substrate processor 300 similar to step S4.

Subsequently, in step S10, the controller 160 detects the degree of particle absorption by the particle absorption tool 10 by using the detector 50 similar to step S5. Subsequently, in step S11, it is determined whether particles in the target area to be subjected to absorption of particles are sufficiently absorbed. For example, in a case in which the detector 50 is the image capturer 52, the controller 160 detects the amount of absorbed particles based on an image of the particle absorption tool 10 captured by the image capturer 52 similar to step S6. If the amount of absorbed particles is greater than the predetermined particle amount threshold, the controller 160 determines that the particles are insufficiently absorbed, and the procedure returns to step S4. If the amount of absorbed particles is not greater than the predetermined particle amount threshold, the controller 160 determines that the particles are sufficiently absorbed. If it is determined that the particles are sufficiently absorbed, the operation of removal of particles inside the semiconductor production apparatus 500 executed by the substrate conveyor 200 ends so that processing in the method for controlling the particle removal system 100 ends. The predetermined particle amount threshold in step S11 can be a value different from that in step S6.

Alternatively, in step S11, it can be determined whether particles in the target area are sufficiently absorbed based on a detection result of the charge-amount detector 51. In this case, the charge amount of the particle absorption tool 10 is detected by the charge-amount detector 51. If the charge amount of the particle absorption tool 10 detected by the charge-amount detector 51 is not greater than the predetermined charge amount threshold, the controller 160 determines that the charge amount was decreased by absorbing the particles in the same target area, and determines that the particles are detected. In this case, the controller determines that the particles are insufficiently absorbed, and the procedure returns to step S4. If the charge amount of the particle absorption tool 10 detected by the charge-amount detector 51 is greater than the predetermined charge amount threshold, the controller 160 determines that particles are not additionally absorbed so that the particles are sufficiently absorbed, and the control procedure ends.

In a case in which a plurality of target areas for absorption of particles are specified, absorption of particles in step S4 can be executed for each of the plurality of target areas, and processes from step S8 to step S11 can be executed to determine whether particles are completely absorbed for each of the plurality of target areas.

Advantages of First Embodiment

The particle removal system 100 includes the controller 160 configured to control operation of the robot 150 to electrostatically charge the particle absorption tool 10 so as to build up the static electric charge by using the charger 20. According to this configuration, because the particle absorption tool 10 is electrostatically charged by using the charger 20 so as to build up the static electric charge by controlling operation of the robot 150 by the controller 160, the particle absorption tool 10 can be charged in an area to be subjected to particle removal by the charger 20 in the interior space of the container. As a result, it is possible to charge the particle absorption tool 10 without opening the area to be subjected to particle removal. Also, because the controller 160 is configured to control operation of the robot 150 to electrostatically charge the particle absorption tool 10 so as to build up the static electric charge by using the charger 20, the particle absorption tool 10 can be automatically charged without manual intervention.

The charger 20 includes the voltage applier 21 configured to contact the particle absorption tool 10 and to apply a voltage to the particle absorption tool 10. The controller 160 is configured to control operation of the robot 150 to bring the voltage applier 21 of the charger 20 into contact with the particle absorption tool 10 to electrostatically charge the particle absorption tool 10 so as to build up the static electric charge. Accordingly, the particle absorption tool 10 can be easily charged so as to build up the static electric charge by relatively simple operation that only brings the voltage applier 21 into contact with the particle absorption tool 10 by using the robot 150.

The robot 150 is placed in the substrate conveyor 200. The hand 151 is configured to hold the substrate 1 and the particle absorption tool 10, which has a disk shape similar to the substrate 1, in the substrate conveyor 200. The controller 160 is configured to control operation of the robot 150 to bring the voltage applier 21 into contact with the disk-shaped particle absorption tool 10 being held by the hand 151 in the substrate conveyor 200 to electrostatically charge the particle absorption tool 10 so as to build up the static electric charge, and to absorb particles in at least one of the interior of the substrate conveyor 200 and an interior of the substrate processor 300 by using the particle absorption tool 10. Accordingly, because the particle absorption tool 10 can be electrostatically charge so as to build up the static electric charge with the disk-shaped particle absorption tool 10, which is similar to the substrate 1, being held by the hand 151 configured to hold the substrate 1, a configuration for charging the particle absorption tool 10 can be prevented from becoming complicated as compared with a case in which a configuration different from the hand 151 configured to hold the substrate 1 is provided. Also, because the particle absorption tool 10 has a disk shape similar to the substrate 1, the particle absorption tool 10 can be easily arranged at a position where the substrate 1 is placed in at least one of the substrate conveyor 200 and the substrate processor 300. Accordingly, it is possible to easily remove particles in at least one of the substrate conveyor 200 and the substrate processor 300. Also, because the particle absorption tool 10 is electrostatically charged so as to build up the static electric charge in the substrate conveyor 200 by operation of the robot 150, it is possible to remove particles in at least one of the substrate conveyor 200 and the substrate processor 300 by using the particle absorption tool 10 that is more sufficiently charged as compared with a case in which the particle absorption tool is charged outside the substrate conveyor 200.

The voltage applier 21 is included in the robot 150. Accordingly, the voltage applier 21 configured to apply a voltage to the particle absorption tool 10 provided to the robot 150, the particle absorption tool 10 can be charged by the voltage applier 21 by using electric power supplied by the robot 150. Because a power supply for charging the particle absorption tool is not necessarily separately provided from the robot 150, it is possible to prevent a configuration of the particle removal system 100 from becoming complicated.

The robot 150 includes the robot arm 152 having an distal end part to which the hand 151 is attached. The voltage applier 21 is arranged in the distal end of the robot arm 152, and is configured to contact the particle absorption tool 10 being held by the hand 151. The controller 160 is configured to bring the voltage applier 21, which is arranged in the distal end of the robot arm 152, into contact with the particle absorption tool 10 being held by the hand 151 to electrostatically charge the particle absorption tool 10 so as to build up the static electric charge. Accordingly, the particle absorption tool 10 can be charged so as to build up the static electric charge by relatively simple operation that only holding the particle absorption tool 10 by using the hand 151. Consequently, because it is not necessary to move the particle absorption tool 10 to the voltage applier 21 dissimilar to a case in which the voltage applier 21 is located separately from the robot 150, the particle absorption tool 10 can be easily charged. Also, because the particle absorption tool 10 can be charged by movement of the robot arm 152 without manual intervention, it is possible to save labor of operators.

The robot 150 includes a mover 153 configured to move the voltage applier 21. The controller 160 is configured to move the voltage applier 21 by using the mover 153 so as to bring the voltage applier 21 into contact with the particle absorption tool 10 being held by the hand 151. Accordingly, the voltage applier 21 can be prevented from contacting the substrate 1 by moving the voltage applier 21 by using the mover 153 in a case in which the substrate 1 is held, and the voltage applier 21 can be brought into contact with the particle absorption tool only in a case in which the particle absorption tool 10 is held. Consequently, the voltage applier 21 can be easily brought into contact only with the particle absorption tool 10.

The voltage applier 21 is configured to contact the interfaces 15 as a contact part that is arranged on a peripheral part of the disk-shaped particle absorption tool 10 so as to apply a voltage to the particle absorption tool 10. Consequently, the voltage applier 21 can be moved from an exterior side of the disk-shape particle absorption tool 10 and be easily brought into contact with the interfaces 15 as compared with a case in which the voltage applier 21 is brought into contact with a central part of the disk-shape particle absorption tool 10.

The particle removal system 100 includes the aligner 140 as a position adjuster configured to adjust a position of the substrate 1 and the disk-shape particle absorption tool 10. The controller 160 is configured to direct the hand 151 to hold the particle absorption tool 10 whose position is being adjusted by the aligner 140, and to bring the voltage applier 21 into contact with the interfaces 15 as the contact part the disk-shaped particle absorption tool 10 being held by the hand 151 with the position of the particle absorption tool being adjusted so as to apply a voltage to the particle absorption tool 10. Consequently, the voltage applier 21 can be more easily brought into contact with the interfaces 15 of the particle absorption tool 10 by adjusting a position of the particle absorption tool by using the aligner 140.

The particle removal system 100 includes the container 30 attached to the substrate conveyor 200, and previously accommodating the particle absorption tool 10. The controller 160 is configured to direct the hand 151 to hold the particle absorption tool 10, which is previously accommodated in the container 30, and to then bring the voltage applier 21 into contact with the particle absorption tool 10 held by the hand 151 to electrostatically charge the particle absorption tool 10 so as to build up the static electric charge.

Accordingly, because the particle absorption tool 10 is previously accommodated in the container 30, the particle absorption tool 10 accommodated in the container 30 can be easily held by the hand 151 by operating the robot 150. In the first embodiment, because the exterior shape of the container 30, which accommodates the particle absorption tool 10, is the same as the exterior shape of the FOUP 110, the container 30, which accommodates the particle absorption tool 10, can be easily arranged in a place where the FOUP 110 in the substrate conveyor 200 is arranged.

The particle removal system 100 includes the detector 50 configured to detect a degree of particle absorption by the particle absorption tool 10. Accordingly, because the controller 160 determines whether the particle absorption tool 10 can further absorb particles based on the detection result obtained by the detector 50, it is possible to prevent that ineffective absorption operation, which uses the particle absorption tool 10 that cannot absorb particles, continues.

The detector 50 includes at least one of the charge-amount detector 51 configured to detect a charge amount of the particle absorption tool 10, and the image capturer 52 configured to capture an image of the particles that are absorbed by the particle absorption tool 10. Accordingly, because the charge-amount detector 51 can detect that the charge amount of the particle absorption tool 10 is relatively large, the controller 160 can determine whether the particle absorption tool 10 can further absorb particles. Also, because it can be detected that an amount of particles adhered onto the particle absorption tool 10 is relatively small based on an image of the particles, which are adhered onto the particle absorption tool 10, captured by the image capturer 52, the controller 160 can determine whether the particle absorption tool 10 can further absorb particles.

The robot 150 includes the robot arm 152 having a distal end part to which the hand 151 is attached. The detector 50 is arranged in the distal end of the robot arm 152, and is configured to detect the degree of particle absorption by the particle absorption tool 10 being held by the hand 151. Accordingly, it is possible to prevent increase of a size of the particle removal system 100 as compared with a case in which the detection of a degree of particle absorption and the charging of the particle absorption tool 10 are executed in separate places.

The particle removal system 100 includes the cleaner 60 configured to clean the particle absorption tool 10. The controller 160 is configured, after absorbing particles by using the particle absorption tool 10, to move the hand 151 so as to move the particle absorption tool 10 to the cleaner 60. Accordingly, because the particle absorption tool 10 onto which particles are adhered can be cleaned, the cleaned particle absorption tool 10 can be charged and used in the next particle absorption operation. Consequently, it is not necessary to prepare a plurality of particle absorption tools 10.

Second Embodiment

The following description describes a container 630 according to a second embodiment of this disclosure.

Figure 12:
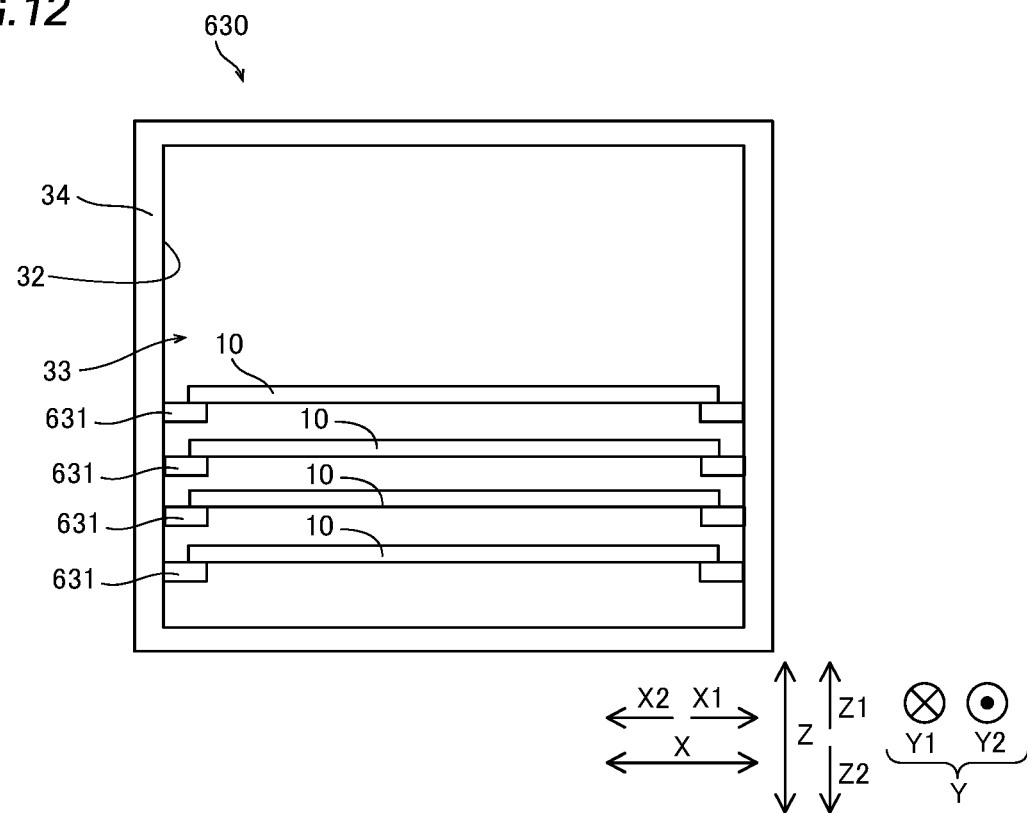
FIG. 12 is a view showing a particle absorption tool accommodated in a container according to a second embodiment.
Figure 13:
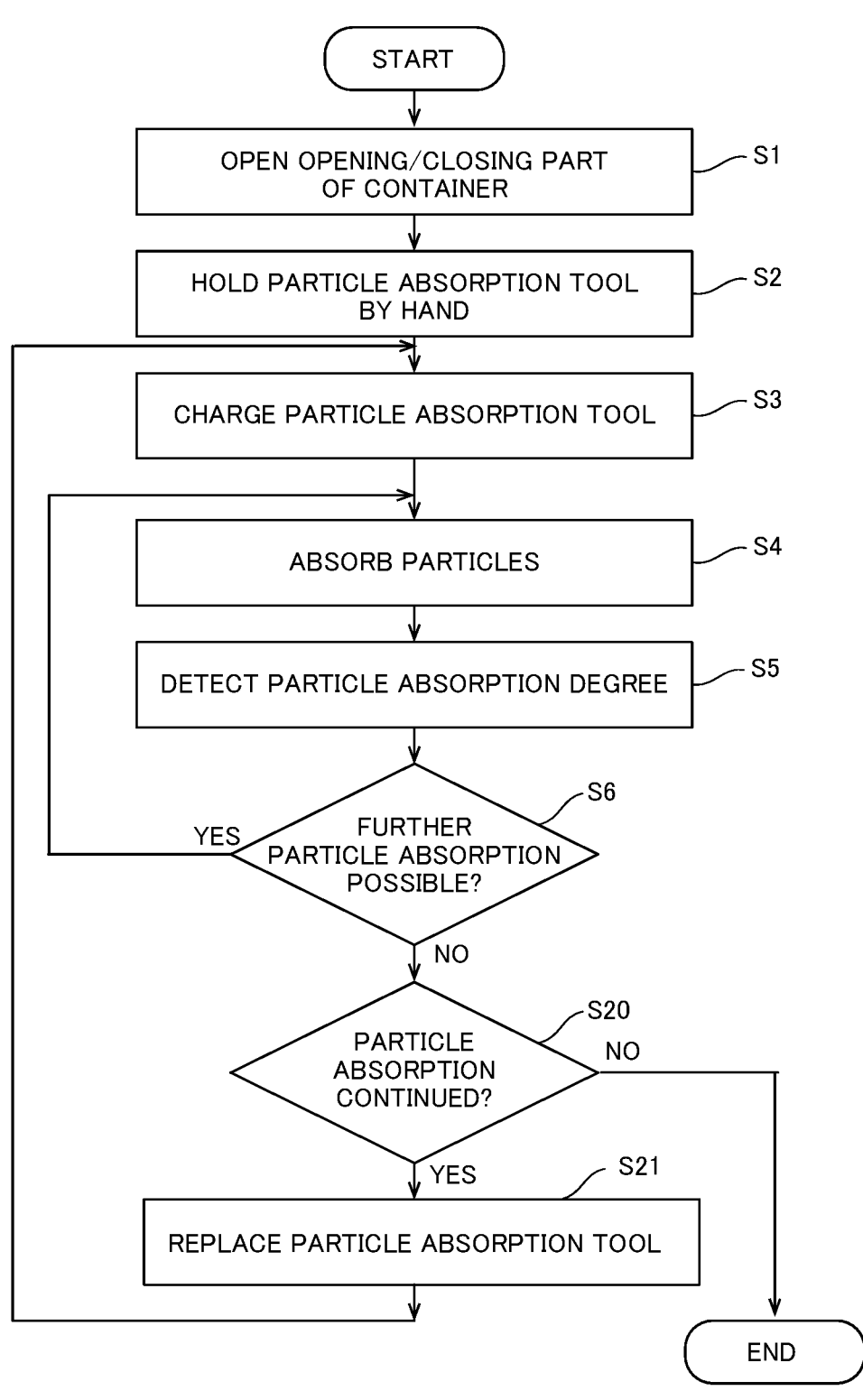
FIG. 13 is a flowchart illustrating a method for controlling a particle removal system according to the second embodiment.

In the second embodiment, as shown in FIG. 12, the container 630 previously accommodates a plurality of particle absorption tools 10. The controller 160 is configured to sequentially change the plurality of particle absorption tools 10 from one after another so as to absorb particles in at least one of an interior of a substrate conveyor 200 and an interior of a substrate processor 300. Specifically, a plurality of supports 631 configured to support the particle absorption tools 10 are placed in an interior of the container 630. The plurality of particle absorption tools 10 are placed on the supports 631. For example, in step S6, as shown in FIG. 13, if determining that the particle absorption tool 10 cannot further absorb particles, the controller 160 determines whether to continue operation of absorption of particles in step S20. If particle absorption continues, proceed to step S21 and the controller 160 executes the process of changing the holding particle absorption tool 10 to the new particle absorption tool 10. Subsequently, the procedure repeats steps S3 to S6 shown in FIG. 13. If no in step S20, the controller 160 ends processing in the method for controlling a particle removal system. Also, in this embodiment, similar to the first embodiment, before ending particle removal, processes from step S8 to step S11 can be executed to determine whether particles are completely absorbed for each of the plurality of target areas.

Advantages of Second Embodiment

The container 630 previously accommodates the plurality of particle absorption tools 10. The controller 160 is configured to sequentially change the plurality of particle absorption tools 10 from one after another so as to absorb particles in at least one of an interior of a substrate conveyor 200 and an interior of a substrate processor 300. Accordingly, even in a case in which the cleaner 60 configured to clean the particle absorption tool 10 is not provided, particles can be absorbed while sequentially changing the plurality of particle absorption tools 10 from one after another.

Modified Embodiments

Note that the embodiment disclosed this time must be considered as illustrative in all points and not restrictive. The scope of the present disclosure is not shown by the above description of the embodiments but by the scope of claims for patent, and all modifications or modified examples within the meaning and scope equivalent to the scope of claims for patent are further included.

While the example in which an exterior shape of the container 30 or 630 is common to an exterior shape of the FOUP 110 has been shown in the aforementioned first and second embodiments, the present disclosure is not limited to this. For example, alternatively, the container can have an exterior shape different from an exterior shape of the FOUP as long as the container can be placed in the substrate conveyor.

While the example in which the particle absorption tool 10 is accommodated in the containers 30 and 630 has been shown in the aforementioned first and second embodiments, the present disclosure is not limited to this. In the present disclosure, alternatively, the particle absorption tool can be accommodated not in the tool container but in the substrate conveyor or the substrate processor.

While the example in which the voltage applier 21 of the charger 20 is arranged in the distal end part of the robot arm 152 of the robot 150 has been shown in the aforementioned first and second embodiments, the present disclosure is not limited to this. In the present disclosure, alternatively, the charger can be arranged in the interior of the substrate conveyor or the interior of the substrate processor. The charger can be arranged in the container. In addition, the charging device can be placed in a container different from the container in which the particle absorption tool is stored.

While the example in which the voltage applier 21 is brought into contact with the interfaces 15 as a contact part that is arranged on a peripheral part of the disk-shaped particle absorption tool 10 so as to apply a voltage to the particle absorption tool 10 by moving the voltage applier 21 by using the mover 153 has been shown in the aforementioned first and second embodiments, the present disclosure is not limited to this. In the present disclosure, alternatively, the voltage applier can be brought into contact with a part of the particle absorption tool other than the peripheral part of the particle absorption tool. For example, the voltage applier can be brought into contact with a central part of the particle absorption tool. In other words, the contact part can be arranged in a central part of a main surface of the particle absorption tool, and the voltage applier can be arranged at the point that allows the voltage applier to come into contact with the central part of the main surface of the particle absorption tool in the hand. In a case in which the voltage applier is brought into contact with a part of the particle absorption tool other than the peripheral part of the particle absorption tool, particles can be absorbed on the same surface as the contact part of the particle absorption tool with which the voltage applier comes into contact. Also, a hand rotation mechanism can be provided to the robot and can be configured to rotate the hand about a rotation axis extending in a horizontal direction to flip the particle absorption tool held by the hand. In a case in which the mover is not provided, the particle absorption tool can always be in contact with the voltage applier when the particle absorption tool is held by the hand.

While the example in which the controller is configured to direct the hand 151 to hold the particle absorption tool 10 whose position is being adjusted by the aligner 140 as the position adjuster, and to bring the voltage applier 21 into contact with the interfaces 15 as the contact part the disk-shaped particle absorption tool 10 being held by the hand 151 with the position of the particle absorption tool being adjusted so as to apply a voltage to the particle absorption tool 10 has been shown in the aforementioned first and second embodiments, the present disclosure is not limited to this. In this disclosure, alternatively, the position adjuster can be omitted. That is, the voltage applier can be brought into contact with the particle absorption tool without adjustment of a position of the particle absorption tool.

While the example in which the particle absorption tool 10 is brought into contact with and charged by the voltage applier 21 by using operation of the robot 150 has been shown in the aforementioned first and second embodiments, the present disclosure is not limited to this. In the present disclosure, alternatively, a lift can be provided and configured to lift the particle absorption tool so that the particle absorption tool lifted by the lift can be charged by the charger. Also, in this configuration, the voltage applier is brought into contact with the particle absorption tool by operating the lift by using operation of the robot. For example, an operation unit configured to accept operation of the lift can be operated by operation of the robot.

While the example in which the voltage applier 21 into contact with the disk-shaped particle absorption tool 10 being held in the substrate conveyor 200 by the hand 151 to electrostatically charge the particle absorption tool 10 so as to build up the static electric charge has been shown in the aforementioned first and second embodiments, the present disclosure is not limited to this. In the present disclosure, alternatively, the voltage applier can be brought into contact with the particle absorption tool not being held by the hand but being placed on a receiving part.

While the example in which the particle absorption tool 10 is electrostatically charged by operation of the robot 150 arranged in the substrate conveyor 200 so as to build up the static electric charge, and to absorb particles in at least one of the interior of the substrate conveyor 200 and the interior of the substrate processor 300 by using the particle absorption tool 10 has been shown in the aforementioned first and second embodiments, the present disclosure is not limited to this. In the present disclosure, alternatively, the particle absorption tool can be charged by a robot that is arranged in a place other than the substrate conveyor so as to build up the static electric charge. For example, the particle absorption tool can be charged by a robot that is arranged in the substrate processor so as to build up the static electric charge. Particles can be absorbed in at least one of the interior of the substrate conveyor 200 and the interior of the substrate processor 300. Also, particles can be absorbed in the FOUP.

While the example in which, the particle removal system 100 includes the detector 50 including the charge-amount detector 51 arranged in the distal end part of the robot arm 152, and the image capturer 52 provided to the aligner 140 as the position adjuster has been shown in the aforementioned first and second embodiments, the present disclosure is not limited to this. In the present disclosure, alternatively, no detector can be included in the particle removal system. In this case, for example, if one cycle of particle absorption operations of the particle absorption tool ends, the cycle of particle absorption operations is completed. Alternatively, the detector can include one of the charge-amount detector and the image capturer. Alternatively, the charge-amount detector or the image capturer can be arranged any of the robot, the substrate conveyor, the substrate processor, and the FOUP. Alternatively, the detector can be arranged outside of the substrate conveyor, the substrate processor, or the FOUP.

While the example in which the hand 151 is an active type hand configured to catch the substrate 1 or the particle absorption tool 10 between the holding part 151a and the hook parts 151b has been shown in the aforementioned first and second embodiments, the present disclosure is not limited to this. In the present disclosure, alternatively, the hand can be an active vacuum type hand. Alternatively, the hand can be a passive type hand configured to non-securely hold the substrate or the particle absorption tool.

While the example in which the particle absorption tool 10 is conveyed to the cleaner 60 arranged in the substrate processor 300 by the robot 150 has been shown in the aforementioned first embodiment, the present disclosure is not limited to this. In the present disclosure, alternatively, the cleaner can be arranged in the substrate conveyor. Alternatively, the cleaner can be arranged outside of the substrate processor and the substrate conveyor. Alternatively, the particle absorption tool can be conveyed to the cleaner by a conveying device different from the robot.

While the example in which the particle removal operation ends after the particle absorption tool 10 is cleaned by the cleaner 60 has been shown in the aforementioned first embodiment, the present disclosure is not limited to this. In the present disclosure, alternatively, after the particle absorption tool is cleaned by the cleaner, operation of the robot can cause the charger to recharge the particle absorption tool and restart the particle removal operation.

While the example in which the controller 160, which is a robot controller, controls operation of the robot 150, operation of the aligner 140 as a position adjuster, operation of the charger 20, operation of the cleaner 60, and detection of a degree of particle absorption by the detector 50 has been shown in the aforementioned first and second embodiments, the present disclosure is not limited to this. In the present disclosure, alternatively, some of controls operation of the robot, operation of the position adjuster, operation of the charger device operation of the cleaner, and detection of a degree of particle absorption by the detector can be executed by different hardware components. For example, a controller that is provided separately from the robot controller for controlling operation of the robot can be configured to control operation of the position adjuster and operation of the cleaner.

Functions of elements disclosed in this specification can be realized by a circuit or processing circuit including a general purpose processor, a dedicated processor, an Integrated circuit, ASIC (Application Specific Integrated Circuits), a conventional circuit and/or combination of them configured or programmed to realize the functions disclosed. Because processors include transistors and other circuits, they are considered as a processing circuit or a circuit. In the present disclosure, circuits, units or means are hardware for realizing the functions stated above, or hardware programmed to realize the functions stated above. The hardware can be hardware disclosed in this specification, or can be other known hardware programed or configured to realize the functions stated above. In the case in which the hardware is a processor that can be considered as one type of circuits, the circuit, means or unit is a combination of hardware and software, and the software is used for configuration of the hardware and/or the processor.

Modes

The aforementioned exemplary embodiment will be understood as concrete examples of the following modes by those skilled in the art.

Mode 1

A particle removal system includes a particle absorption tool configured to be electrostatically charged so as to build up a static electric charge for absorbing particles; a charger configured to electrostatically charge the particle absorption tool so as to build up the static electric charge; a robot including a hand configured to hold the particle absorption tool; and a controller configured to control operation of the robot to electrostatically charge the particle absorption tool so as to build up the static electric charge by using the charger.

Mode 2

In the particle removal system according to mode 1, the charger includes a voltage applier configured to contact the particle absorption tool and to apply a voltage to the particle absorption tool; and the controller is configured to control operation of the robot to bring the voltage applier of the charger into contact with the particle absorption tool to electrostatically charge the particle absorption tool so as to build up the static electric charge.

Mode 3

In the particle removal system according to mode 2, the robot is arranged in a substrate conveyor; the hand is configured to hold a substrate and the particle absorption tool, which has a disk shape similar to the substrate, in the substrate conveyor; and the controller is configured to control operation of the robot to bring the voltage applier into contact with the disk-shaped particle absorption tool being held by the hand in the substrate conveyor to electrostatically charge the particle absorption tool so as to build up the static electric charge, and to absorb particles in at least one of an interior of the substrate conveyor and an interior of a substrate processor by using the particle absorption tool.

Mode 4

In the particle removal system according to mode 2 or 3, the voltage applier is included in the robot.

Mode 5

In the particle removal system according to mode 4, the robot includes a robot arm having an distal end part to which the hand is attached; the voltage applier is arranged in the distal end of the robot arm, and is configured to contact the particle absorption tool being held by the hand; and the controller is configured to bring the voltage applier, which is arranged in the distal end of the robot arm, into contact with the particle absorption tool being held by the hand to electrostatically charge the particle absorption tool so as to build up the static electric charge.

Mode 6

In the particle removal system according to mode 5, the robot includes a mover configured to move the voltage applier; and the controller is configured to move the voltage applier by using the mover so as to bring the voltage applier into contact with the particle absorption tool being held by the hand.

Mode 7

In the particle removal system according to mode 3, the voltage applier is configured to contact a contact part that is arranged on a peripheral part of the disk-shaped particle absorption tool so as to apply the voltage to the particle absorption tool.

Mode 8

In the particle removal system according to mode 7, a position adjuster configured to adjust a position of the substrate and the disk-shaped particle absorption tool is further provided; and the controller is configured to direct the hand to hold the particle absorption tool whose position is being adjusted by the position adjuster, and to bring the voltage applier into contact with the contact part of the disk-shaped particle absorption tool being held by the hand with the position of the particle absorption tool being adjusted so as to apply the voltage to the particle absorption tool.

Mode 9

In the particle removal system according to mode 3, a container attached to the substrate conveyor, and previously accommodating the particle absorption tool is further provided; and the controller is configured to direct the hand to hold the particle absorption tool, which is previously accommodated in the container, and to then bring the voltage applier into contact with the particle absorption tool held by the hand to electrostatically charge the particle absorption tool so as to build up the static electric charge.

Mode 10

In the particle removal system according to any of modes 1 to 9, a detector configured to detect a degree of particle absorption by the particle absorption tool is further provided.

Mode 11

In the particle removal system according to mode 10, the detector includes at least one of a charge-amount detector configured to detect a charge amount of the particle absorption tool, and an image capturer configured to capture an image of the particles that are absorbed by the particle absorption tool.

Mode 12

In the particle removal system according to mode 10 or 11, the robot includes a robot arm having an distal end part to which the hand is attached; the detector is arranged in the distal end of the robot arm, and is configured to detect the degree of particle absorption by the particle absorption tool being held by the hand.

Mode 13

In the particle removal system according to any of modes 1 to 12, a cleaner configured to clean the particle absorption tool is further provided; and the controller is configured to, after absorbing particles by using the particle absorption tool, to move the hand so as to move the particle absorption tool to the cleaner.

Mode 14

In the particle removal system according to mode 9, the container previously accommodates a plurality of particle absorption tool as the particle absorption tool; and the controller is configured to sequentially change the plurality of particle absorption tool from one after another so as to absorb particles in at least one of the interior of the substrate conveyor and an interior of a substrate processor.

Mode 15

A method for controlling a particle removal system includes holding a particle absorption tool configured to be electrostatically charged so as to build up a static electric charge for absorbing particles by using a hand included in a robot; electrostatically charging the particle absorption tool so as to build up the static electric charge by using the charger by operating the robot; and absorbing the particles by using the particle absorption tool building up the static electric charge.

What is claimed is:

1. A particle removal system comprising:
a particle absorption tool configured to be electrostatically charged so as to build up a static electric charge for absorbing particles;
a charger configured to electrostatically charge the particle absorption tool so as to build up the static electric charge;
a robot including a hand configured to hold the particle absorption tool; and
a controller configured to perform operations comprising operations to control operation of the robot to electrostatically charge the particle absorption tool so as to build up the static electric charge by using the charger, wherein
the charger includes a voltage applier configured to contact the particle absorption tool and to apply a voltage to the particle absorption tool,
the robot is arranged in a substrate conveyor and includes a mover configured to move the voltage applier, the voltage applier is configured to contact a contact part that is arranged on a peripheral part of the disk-shaped particle absorption tool so as to apply the voltage to the particle absorption tool,
the hand is configured to selectively hold a substrate and to hold the particle absorption tool in the substrate conveyor, the particle absorption tool having a disk shape similar to the substrate, and
the controller is configured to perform operations further comprising operations to:
control operation of the robot to bring the voltage applier into contact with the disk-shaped particle absorption tool being held by the hand in the substrate conveyor to electrostatically charge the particle absorption tool so as to build up the static electric charge, and to absorb particles in at least one of an interior of the substrate conveyor and an interior of a substrate processor by using the particle absorption tool;
move the voltage applier using the mover to bring the voltage applier into contact with the particle absorption tool, in response to the particle absorption tool being held by the hand; and
move the voltage applier using the mover to retract the voltage applier in response to the particle absorption tool being removed from the hand such that the substrate is capable of being held by the hand.

2. The particle removal system according to claim 1, wherein the voltage applier is included in the robot.

3. The particle removal system according to claim 2, wherein the robot includes a robot arm having a distal end part to which the hand is attached;
the voltage applier is arranged in the distal end of the robot arm, and is configured to contact the particle absorption tool being held by the hand; and
the controller is configured to perform operations further comprising operations to bring the voltage applier, which is arranged in the distal end of the robot arm, into contact with the particle absorption tool being held by the hand to electrostatically charge the particle absorption tool so as to build up the static electric charge.

4. The particle removal system according to claim 1 further comprising a position adjuster comprising a detector and an aligner, the position adjuster configured to adjust a position of the substrate and the disk-shaped particle absorption tool, wherein
the controller is configured to perform operations further comprising operations to direct the hand to hold the particle absorption tool whose position is being adjusted by the position adjuster, and to bring the voltage applier into contact with the contact part of the disk-shaped particle absorption tool being held by the hand with the position of the particle absorption tool being adjusted so as to apply the voltage to the particle absorption tool.

5. The particle removal system according to claim 1 further comprising a container attached to the substrate conveyor, and previously accommodating the particle absorption tool, wherein
the controller is configured to perform operations further comprising operations to direct the hand to hold the particle absorption tool, which is previously accommodated in the container, and to then bring the voltage applier into contact with the particle absorption tool held by the hand to electrostatically charge the particle absorption tool so as to build up the static electric charge.

6. The particle removal system according to claim 5, wherein the container previously accommodates a plurality of particle absorption tools as the particle absorption tool; and the controller is configured to perform operations further comprising operations to sequentially change the plurality of particle absorption tools from one after another so as to absorb particles in at least one of the interior of the substrate conveyor and the interior of the substrate processor.

7. The particle removal system according to claim 1 further comprising a detector configured to detect a degree of particle absorption by the particle absorption tool.

8. The particle removal system according to claim 7, wherein the detector includes at least one of a charge-amount detector configured to detect a charge amount of the particle absorption tool, and an image capturer configured to capture an image of the particles that are absorbed by the particle absorption tool.

9. The particle removal system according to claim 7, wherein the robot includes a robot arm having a distal end part to which the hand is attached; and the detector is arranged in the distal end of the robot arm, and is configured to detect the degree of particle absorption by the particle absorption tool being held by the hand.

10. The particle removal system according to claim 1 further comprising a cleaner configured to clean the particle absorption tool, wherein the controller is configured to perform operations further comprising operations to, after absorbing particles by using the particle absorption tool, move the hand so as to move the particle absorption tool to the cleaner.

11. A method for controlling a particle removal system comprising:

holding a particle absorption tool configured to be electrostatically charged so as to build up a static electric charge for absorbing particles by using a hand included in a robot;

electrostatically charging the particle absorption tool so as to build up the static electric charge by using a charger by operating the robot; and absorbing the particles by using the particle absorption tool building up the static electric charge, wherein the charger includes a voltage applier configured to contact the particle absorption tool and to apply a voltage to the particle absorption tool, the robot is arranged in a substrate conveyor and includes a mover configured to move the voltage applier, the voltage applier is configured to contact a contact part that is arranged on a peripheral part of the disk-shaped particle absorption tool so as to apply the voltage to the particle absorption tool, the hand is configured to selectively hold a substrate and to hold the particle absorption tool in the substrate conveyor, the particle absorption tool having a disk shape similar to the substrate, and the method further comprises:

controlling operation of the robot to bring the voltage applier into contact with the disk-shaped particle absorption tool being held by the hand in the substrate conveyor to electrostatically charge the particle absorption tool so as to build up the static electric charge, and to absorb particles in at least one of an interior of the substrate conveyor and an interior of a substrate processor by using the particle absorption tool;

moving the voltage applier using the mover to bring the voltage applier into contact with the particle absorption tool, in response to the particle absorption tool being held by the hand; and moving the voltage applier using the mover to retract the voltage applier in response to the particle absorption tool being removed from the hand such that the substrate is capable of being held by the hand.

* * * * *